United States Patent
Zdunek et al.

(10) Patent No.: US 6,290,088 B1
(45) Date of Patent: *Sep. 18, 2001

(54) CORROSION RESISTANT GAS CYLINDER AND GAS DELIVERY SYSTEM

(75) Inventors: Alan D. Zdunek, Chicago; Eugene A. Kernerman, Mt. Prospect, both of IL (US); William Korzeniowski, Dayton, NJ (US)

(73) Assignees: American Air Liquide Inc., Countryside, IL (US); Air Liquide Americas America Corporation, Houston, TX (US); L'Air Liquide, Societe Anonyme pour l'Etude et l'Exploitation des Procedes Georges Claude, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/322,667

(22) Filed: May 28, 1999

(51) Int. Cl.[7] .................................... C23C 18/36

(52) U.S. Cl. .................. 220/586; 220/62.11; 106/1.22; 106/1.27

(58) Field of Search ................ 220/586, 62.11, 220/62.17; 106/1.22, 1.24, 1.28, 1.27

(56) References Cited

U.S. PATENT DOCUMENTS

| | | | |
|---|---|---|---|
| 2,908,419 | 10/1959 | Talmey et al. | 220/63 |
| 3,077,285 | 2/1963 | Budininkas | 220/64 |
| 3,416,955 | * 12/1968 | Makowski | 106/1.27 |
| 3,565,667 | * 2/1971 | Klingspor | 106/1.27 |
| 3,978,803 | 9/1976 | Asano et al. | 113/120 |

(List continued on next page.)

OTHER PUBLICATIONS

Micro: Zadunek et al.; "Using A Nondestructive Test To Qualify Corrosive Specialty Gas Cylinders"; Feb. 1999; Starting at p. 33.

NACE International: "Quality Evaluation of Electroless Nickel Coatings"; 1994; Starting at p. 426.

ASTM: "Standard Guide for Autocatalytic Nickel–Phosphorus Deposition on Metals for Engineering Use"; Starting at p. 426.

1995 PF Directory: Martin W. Bayes; "Electroless Nickel Plating" Starting at p. 118.

AESF—Electroless Plating: Fundamentals and Applications—Juan Hajdu; Chapter 7 "Surface Preparation For Electroless Nickel Plating"; starting at p. 193.

(List continued on next page.)

*Primary Examiner*—Joseph M. Moy
(74) *Attorney, Agent, or Firm*—Brinks Hofer Gilson & Lione

(57) ABSTRACT

A corrosion resistant gas cylinder and gas delivery system includes an electroless nickel-phosphorous layer overlying the inner surface of a steel alloy cylinder. The nickel-phosphorous layer has a thickness of at least about 20 micrometers and a porosity of no greater than about 0.1%. The electroless nickel-phosphorous layer has a phosphorous content of at least about 10% by weight and a surface roughness of no greater than about 5 micrometers. Prior to introducing liquefied gas into the gas cylinder, a cleaning process is carried out using a two-step baking process to clean the surface of the nickel-phosphorus layer. The nickel-phosphorous layer substantially reduces the contamination of liquefied corrosive gasses stored in the gas cylinder by metal from the steel wall surface underlying the nickel-phosphorous layer. Metal contamination levels of less than about 55 ppb of iron, 10 ppb of chromium, and 5 ppb of nickel by weight can be maintained in liquefied corrosive gasses stored for an extended period of time in the electroless nickel-phosphorus plated gas cylinder.

13 Claims, 3 Drawing Sheets

U.S. PATENT DOCUMENTS

| | | | |
|---|---|---|---|
| 4,359,039 | 11/1982 | Uchikawa | 126/19 |
| 4,471,883 * | 9/1984 | Kitamura et al. | 220/62.17 |
| 4,483,711 * | 11/1984 | Harbulak | 106/1.22 |
| 4,636,255 | 1/1987 | Tsuda et al. | 106/1.22 |
| 4,686,152 | 8/1987 | Matsubayashi et al. | 428/607 |
| 4,906,533 * | 3/1990 | Kagechika | 220/62.17 |
| 5,000,368 | 3/1991 | Turner | 228/131 |
| 5,084,312 | 1/1992 | Krikorian et al. | 428/35.8 |
| 5,085,745 | 2/1992 | Farber et al. | 204/129.35 |
| 5,188,714 | 2/1993 | Davidson et al. | 204/129.35 |
| 5,259,935 | 11/1993 | Davidson et al. | 204/129.1 |
| 5,330,091 | 7/1994 | Collier et al. | 228/107 |
| 5,441,219 | 8/1995 | Rauscher et al. | 244/135 |
| 5,485,736 | 1/1996 | Collier et al. | 72/47 |
| 5,749,389 | 5/1998 | Ritrosi et al. | 137/15 |
| 5,761,911 | 6/1998 | Jurcik et al. | 62/50.2 |
| 5,781,830 | 7/1998 | Gaylord et al. | 399/109 |

OTHER PUBLICATIONS

Workshop on Gas Distribution Systems—SEMI; Zadunek et al.; "A Corrosion Engineering Perspective to Specialty Gas Distribution Systems"; Jul. 14, 1998; Starting at page K–1.

ASTM: "Standard Specification For Autocatalytic Nickel–Phosphorus Coatings on Metals"; Starting at p. 500.

International PCT Search Report, PCT/US00/14633, International Filing Date May, 26, 2000.

* cited by examiner

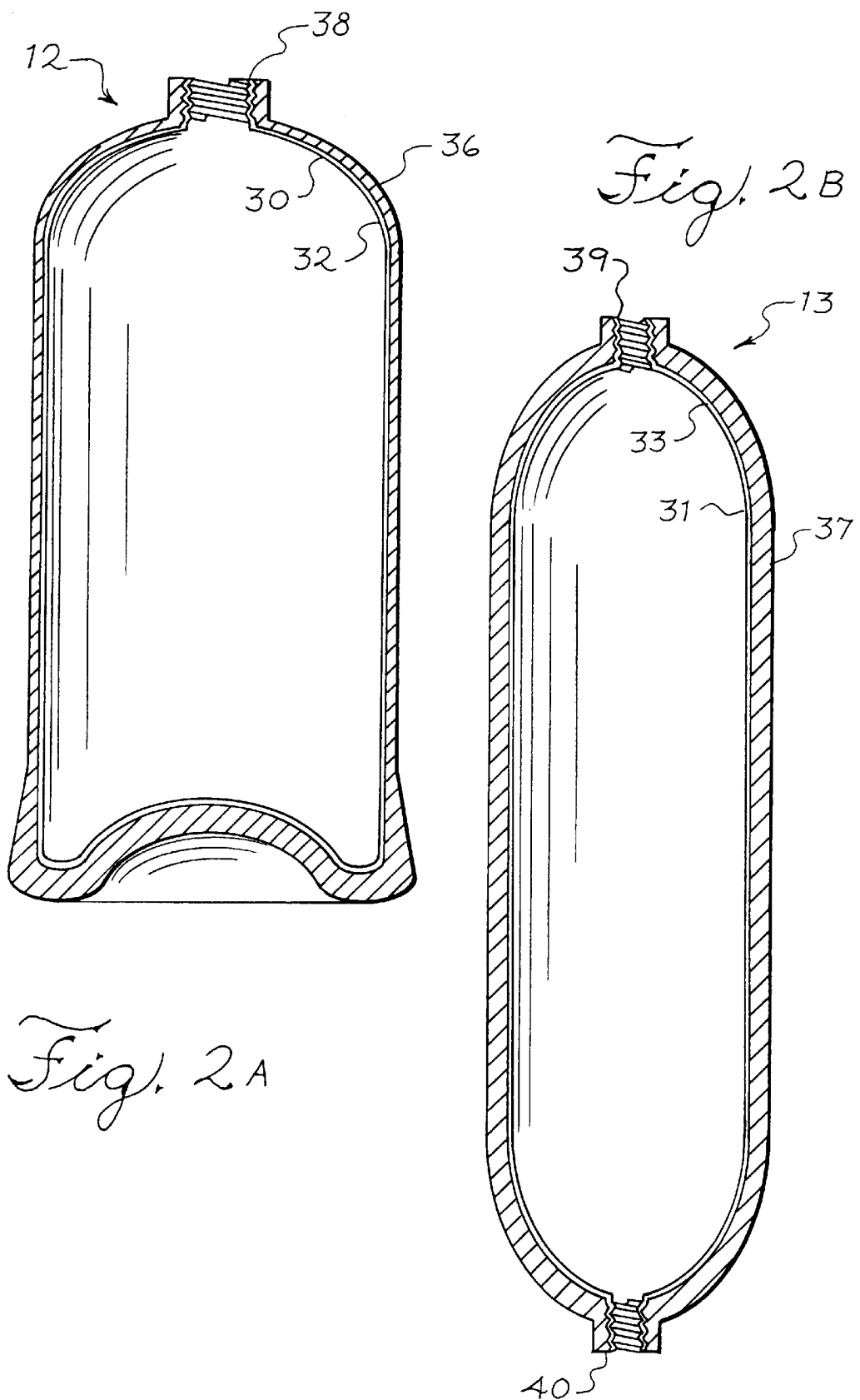

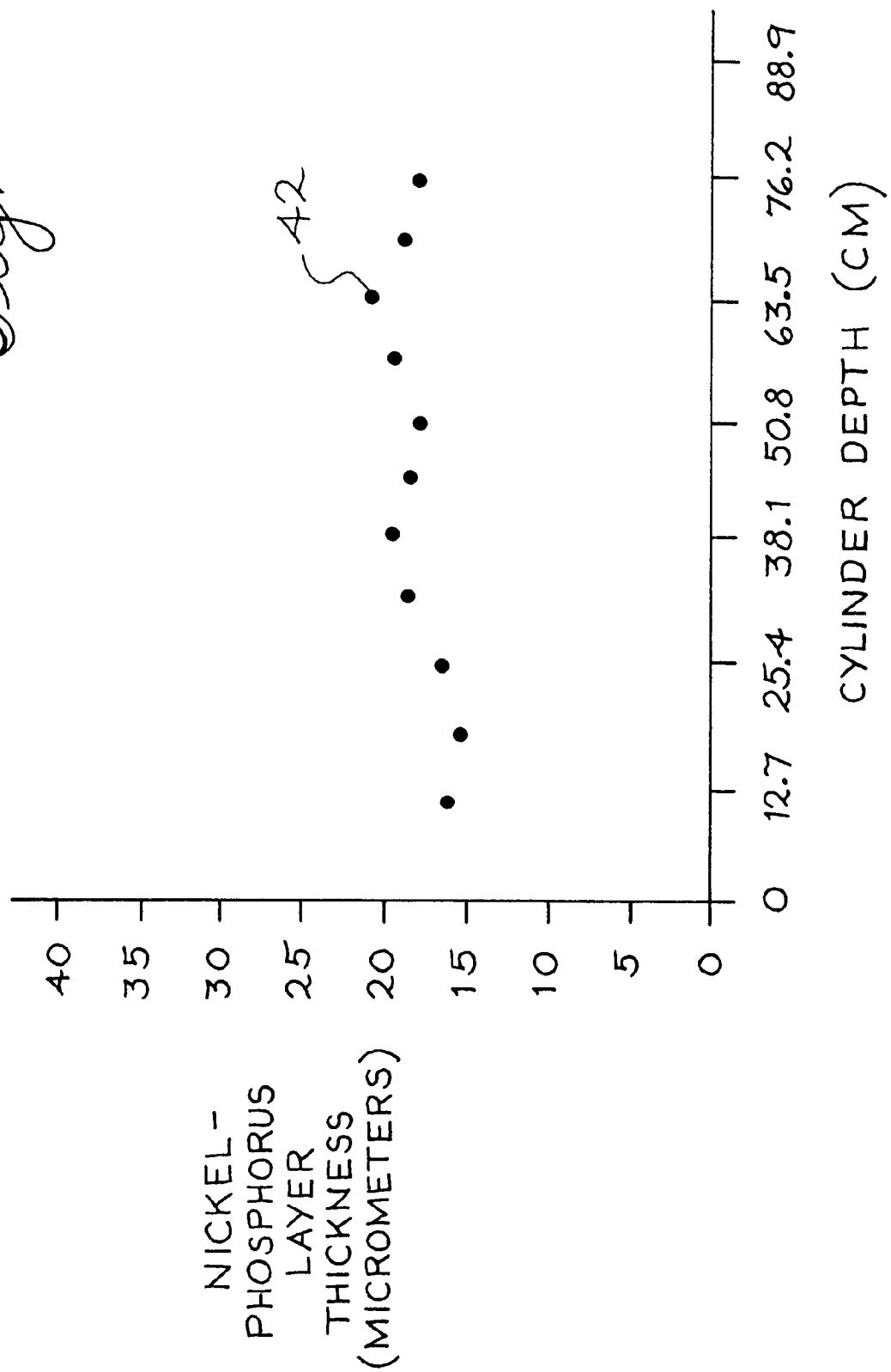

CORROSION RESISTANT GAS CYLINDER AND GAS DELIVERY SYSTEM

FIELD OF THE INVENTION

The present invention relates, in general, to high pressure gas delivery systems and containment vessels, and more particularly, to gas delivery systems and containment vessels for the delivery of high-purity, corrosive, liquefied gasses.

BACKGROUND OF THE INVENTION

Systems for the delivery of high-purity, corrosive, liquefied gasses are an important component in a variety of manufacturing industries. For example, a reliable supply of ultra, high-purity electronic specialty gasses is critical to maintaining productivity and manufacturing yield in the semiconductor industry. The delivery of corrosive, liquefied gasses can be problematic, because of the highly corrosive and reactive nature of these gasses. Halogenated gasses, such as boron trichloride ($BCl_3$), hydrogen chloride (HCl), and the like, can hydrolyze in the presence of moisture and react with the metal surfaces of containment vessels and gas supply lines. Any gas-surface reactions taking place within the gas delivery system can produce unwanted particulate contamination.

The demand for ultra-high purity gasses in the electronics industry, requires that suppliers provide gas delivery systems and containment vessels that are capable of remaining nonreactive with the contained gasses over many product refill cycles. Gas cylinders are widely used to delivery high-pressure gasses in a safe and controlled manner. Typically, gas cylinders are constructed of low-carbon steel. However, to attain the required purity levels and service life demanded in the electronics industry, low-carbon steel cylinders require special materials of construction, or additional treatments, to minimize metal contamination from the cylinder walls. To maintain high purity levels for storage of specialty gasses, the internal surfaces of steel surfaces are polished and baked to remove contaminants and residual moisture. For example, it is known to perform a vacuum baking process of an electro-polished carbon steel cylinder. The electro polishing process is carried out with a chromium-rich electroplating solution to provide a surface layer with reduced iron and increased carbon and chromium.

While the electropolishing and vacuum baking of gas cylinders can be sufficient to avoid metal contamination in non-corrosive gases, such as nitrogen, the storage of highly corrosive gas requires more extensive cylinder preparation procedures to reduce metal contamination. To combat the metal contamination problem in corrosive gas delivery systems, an electroplated nickel layer can be formed on the internal surfaces of a steel cylinder. For example, it is known to provide a gas cylinder having an electroplated nickel lining. Since nickel is substantially nonreactive with corrosive gasses, such as $BCl_3$, HCl, and the like, nickel represents a preferred material of construction for corrosive gas cylinders. Because nickel has a very low reaction rate with halogenated gasses, cylinder walls of nickel can provide the required low metal contamination levels needed by the semiconductor industry.

Although nickel coated steel cylinders offer advantages in gas delivery systems supplying corrosive gas, it is often difficult to obtain a high-quality nickel lining. For example, nickel plating can have cracks, and voids exposing the underlying steel cylinder surface. Additionally, conventional nickel plating can result in a rough surface topography that can trap contaminants. Although electroplated nickel avoids many of the problems encountered by conventionally plated nickel, high-quality electroplated nickel is obtained by application of a nickel coating at a point in the cylinder manufacturing process before the cylinder neck is formed. This is necessary to allow electrodes to be placed correctly inside the cylinder. The cumbersomeness of the nickel electroplating process drives up manufacturing costs and increases the amount of time necessary to fabricate a gas cylinder. Additionally, to ensure that cracks and voids are not formed, the electroplating process is extended for a period of time long enough to deposit a 250–500 micrometer thick layer of nickel.

Because of the inherent difficulty in electroplating a nickel layer to the inner surfaces of a previously formed cylinder, processes have been developed to electroplate the nickel layer prior to the drawing process used to form the cylinder. While avoiding the difficulty of arranging electrodes within a previously drawn cylinder, the steel sheet electroplating process requires the application of additional treatments, such as lubricant application and additional processing to relieve the plating stress induced in electroplated nickel.

Nickel coated gas cylinders remain a viable means for achieving the low metal contamination levels demanded by the electronics industry. However, present nickel-coated gas cylinders can only be obtained by relatively expensive, complex manufacturing processes. Additionally, existing nickel-coated cylinders often exhibit non-uniform nickel layers in which bare steel surfaces are exposed. Accordingly, an improved gas cylinder and delivery system is needed to ensure low metal contamination in gas delivery systems used for handling corrosive electronic specialty gasses.

SUMMARY OF THE INVENTION

The present invention is for a high-pressure steel gas cylinder having an electroless nickel-phosphorous layer overlying the inner surface of the cylinder. The electroless nickel-phosphorous coating is a metallic, nickel-phosphide glass formed on the interior surface of a steel cylinder. The electroless nickel-phosphorous layer passivates the steel surface by forming a strongly bonded, low-porosity surface layer that resists undercutting and has a consistent thickness. In addition to exhibiting a uniform thickness, the electroless nickel-phosphorous layer has a smooth surface topography, which mimics the underlying steel surface. Additionally, the electroless nickel-phosphorous layer is substantially thermodynamically stable in corrosive environments. The electroless nickel-phosphorous layer has a relatively and low corrosion potential, when compared to nonpassivated 316 and 304 stainless steel. The relative nonreactivity of the electroless nickel-phosphorous renders the material approximately a noble metal similar in nonreactiveness to Hastelloy B and C series alloys in an aqueous halide environment.

In addition to exhibiting good morphologic characteristics, the electroless nickel-phosphorous plating process can be carried out after the steel cylinder has been completely drawn and threaded. After completing the plating process is complete, a cleaning process to be carried out to clean the surface of the nickel-phosphorus layer in preparation for charging the cylinder with liquefied gas.

In one form, a high-pressure gas cylinder formed in accordance with the invention includes a cylinder wall having an inner surface. A nickel-phosphorous layer overlies the inner surface of the cylinder. The nickel-phosphorous layer has a thickness of at least about 20 micrometers and a porosity no greater than about 0.10% and a surface roughness of no greater than about 5 micrometers. The electroless nickel-phosphorous layer is subjected to an acid wash and a hot deionized water washing, followed by a first bake under continuous nitrous flow and a second bake under vacuum pressure.

BRIEF DESCRIPTION OF THE DRAWINGS

FIG. 2-A is a cross-sectional view of a gas cylinder arranged in accordance with the invention;

FIG. 2-B is a cross-sectional view of a ton-cylinder arranged in accordance with the invention;

FIG. 5 is a plot of thickness versus cylinder depth for an electroless nickel-phosphorous coating formed in accordance with the invention.

Figure 1:
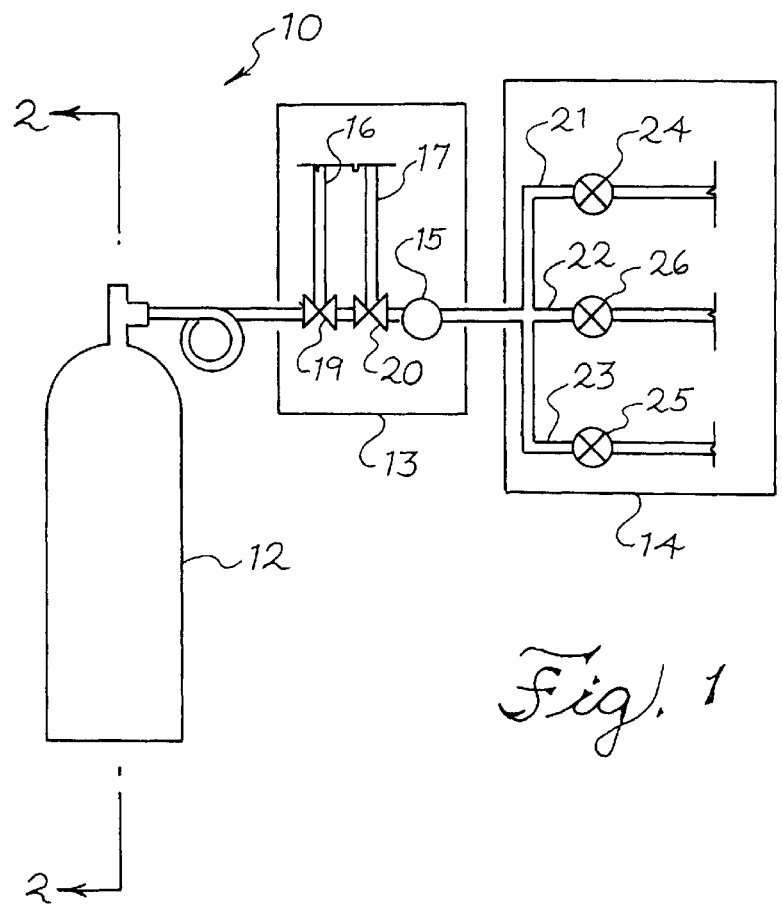
FIG. 1 is a schematic diagram of a gas delivery system arranged in accordance with one embodiment of the invention.

It will be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION OF PREFERRED EMBODIMENTS

Shown in FIG. 1 is a schematic diagram of a gas delivery system 10 configured for the delivery of high-purity, corrosive gasses to semiconductor processing equipment (not shown). Gas delivery system 10 includes a gas cylinder 12 coupled to a gas panel 13 and to a gas manifold enclosed in a valve manifold box (VMB) 14. A regulator 15 controls the gas pressure in gas delivery system 10. In gas panel 13, a nitrogen purge line 16 and a vacuum line 17 are connected to a source gas line 18 through valves 19 and 20, respectively. In VMB 14, individual lines 21, 22, and 23 can be directed to one or more pieces of manufacturing equipment. Mass flow controllers 24, 26, and 28 regulate the flow of gas to the processing equipment from gas lines 21, 22, and 23, respectively.

The delivery of high-purity, corrosive gas by gas delivery system 10 requires that all interior surfaces exposed to the corrosive gas be relatively nonreactive. In accordance with the invention, the internal surfaces of at least gas cylinder 12 are coated with an electroless nickel-phosphorous layer having a thickness of at least about 20 micrometers.

Those skilled in the art will recognize gas delivery system 10 to be one possible configuration of a gas delivery system suitable for delivery of corrosive gasses to electronics industry processing equipment. Although a typical configuration is illustrated, various modifications of the design illustrated in FIG. 1 can be provided and are within the scope of the present invention. For example, more than one gas cylinder can be coupled to gas VMB 14, or larger vessels, such as ton-cylinders or tube trailers can be coupled to VMB 14. Further, gas panel 13 can have a wide variety of configurations, such as disclosed in commonly-assigned U.S. Pat. No. 5,749,389 to Ritrosi, et al., and commonly-assigned U.S. Pat. No. 5,761,911 to Jurcik, et al., both of which are incorporated by reference herein. Moreover, gas manifold 14 itself can have a wide variety of configurations, including multiple individual gas lines and additional mass flow controllers. Gas delivery system 10 can supply etching gasses, such as chlorine ($Cl_2$), hydrogen bromide (HBr), boron chloride ($BCl_3$), hydrogen chloride (HCl), and the like, to one or more pieces of etching equipment at a relatively high pressure. In one embodiment, gas cylinder 12 is charged with about 100 lbs. of a liquefied etching gas, such as HCl, HBr, $BCl_3$, HCl, $Cl_2$ and the like, and delivers the etching gas to an etching machine at a suitable flow rate and having a metal concentration of no more than about 200 parts-per-billion (ppb), and preferably no more than about 100 ppb. In a preferred embodiment, the liquefied etching gases are obtained by a controlled differential pressure vapor transfer method. This method is disclosed in commonly-assigned, co-pending patent application to T. Jacksier and J. Borzio entitled "Purification of Electronic Specialty Gases By Vapor-Phase Transfilling," having Ser. No. 09/238,417 filed Jan. 28, 1999 and is incorporated by reference herein. These gases are all commercially available from American Air Liquide. The gas production process yields gases of high-purity typically having metal contaminants such as iron, chromium, and nickel at a concentration of less than about 100 ppb by weight.

The low metal contaminant levels obtained from gas delivery system 10 are achieved, in part, by coating the internal metal surfaces of gas cylinder 12 with an electroless nickel-phosphorous coating having a thickness of preferably at least about 20 micrometers, and more preferably having a thickness of about 20 to 50 micrometers, and most preferably having a thickness of about 25 micrometers.

FIG. 2-A illustrates a cross-sectional view of gas cylinder 12 taken along section line 2—2 of FIG. 1. In a preferred embodiment of the invention, a continuous nickel-phosphorous layer 30 overlies an inner surface 32 of a tank wall 36. Nickel-phosphorous layer 30 is formed by an electroless plating process, in which the nickel-phosphorous is deposited to a thickness of preferably at least about 20 micrometers, and more preferably to a thickness of about 20 to about 50 micrometers, and most preferably to a thickness of about 25 micrometers. Additionally, nickel-phosphorous layer 30 has a porosity of no greater than about 0.5%, and preferably no greater than about 0.1%, and most preferably no greater than about 0.02%. Since low porosity is an important factor in obtaining low metal concentrations in liquefied corrosive gasses, ideally, the porosity of nickel-phosphorous layer 30 should be as low as possible. Gas cylinder 12 has a threaded opening 38 for insertion of a gas valve. The threads can be located on either the inner surface or the outer surface of opening 38.

The formation of nickel-phosphorous layer 30 to a uniform thickness and a low porosity creates a chemically passive barrier that reduces metal dissolution from inner surface 32 into the liquefied gas contained within gas cylinder 12. Typically, gas cylinders, such as gas cylinder 12, are constructed from steel listed in USDOT Specification 3AA, such as Types 4130, NE8630, 9115, 9125, carbon-boron steel, intermediate-manganese steel, and the like. In a preferred embodiment of the invention, gas cylinder 12 is constructed of Type 4130 steel, or alternatively, intermediate-manganese steel. Accordingly, the metal contaminants that must be reduced in order to provide high-purity gas for electronics applications are those typically found in the previously described steel alloys. By forming nickel-phosphorous layer 30 to the parameters described above, metal contaminants, such as iron (Fe), chromium (Cr), nickel (Ni), and the like are substantially reduced in gas stored in gas cylinder 12. Other metal contaminants originating from inner surface 32 can include copper (Cu), phosphorous (P), arsenic (As), cadmium (Cd), sodium (Na), lead (Pb), tin (Sn), zinc (Zn), and the like.

By forming a nickel-phosphorous layer on inner surface 32 having a thickness of at least about 20 micrometers and a porosity of no greater than about 0.1%, and preferably no greater than about 0.02%, high-purity corrosive gasses can be stored in and delivered by gas delivery system 10 that contain an Fe concentration of preferably no greater then about 100 ppb, and more preferably, no greater than about 60 ppb, and most preferably, no greater than about 55 ppb by weight. Additionally, high-purity gasses can be stored and delivered that have a Cr concentration of preferably no greater than about 100 ppb, and more preferably, no greater than about 90 ppb, and most preferably, no greater than about 10 ppb by weight, and a Ni concentration of no greater than about 100 ppb, and more preferably, no greater than about 40 ppb, and most preferably, no greater than about 5 ppb by weight. Furthermore, high-purity corrosive gasses can be stored and delivered by gas cylinder 12 that contain no greater than about 2 ppb by weight of Cu, P, As, Cd, Na, Pb, Sn, Fn, and the like.

In addition to having a uniform thickness and low porosity, nickel-phosphorous layer 30 has a surface roughness of preferably no more than about 5 micrometers, and more preferably no greater than about 1 micrometer. In an electroless nickel-phosphorous layer formed in accordance with the invention, the surface roughness varies from about 0.33 micrometers to about 4.62 micrometers.

In the electroless plating process used to form nickel-phosphorous layer 30, the process parameters can be adjusted to deposit a nickel-phosphorous layer having a relatively wide compositional range. For example, the electroless plating process can deposit a nickel-phosphorous layer having a phosphorous concentration ranging from about 1% by weight to about 15% by weight. Preferably, nickel-phosphorous layer 30 is a high-phosphorous layer having a phosphorous concentration of at least about 10% by weight phosphorous. In addition to nickel and phosphorous, nickel-phosphorous layer 30 can contain trace amounts of other elements, such as boron, salvation agents, pH adjusting agents, reducing agents, chelating agents, stabilizers, and the like.

FIG. 2-B illustrates a cross-sectional view of a double-ended ton cylinder 13. Ton cylinder 13 is used for the storage of large quantities of gas and can be one of a number of such cylinders positioned on a tube trailer. Ton cylinder 13 has a diameter of about 2 feet and a length of about 6.5 feet and can hold about 600 lbs. of liquefied gas.

In accordance with the invention, a nickel-phosphorous layer 31 overlies an inner surface 33 of a tank wall 37 of ton cylinder 13. Nickel-phosphorous layer 31 has a thickness and porosity similar to layer 30 in gas cylinder 12. To facilitate the removal of liquefied gas, ton cylinder 13 has a first threaded opening 39 opposite a second threaded opening 40. The threads can be located on either the inner surface or the outer surface of openings 39 and 40.

Those skilled in the art will recognize that other types of gas cylinders, including tanker-sized gas containers can be coated with an electroless nickel-phosphorous coating. It is contemplated by the present invention that all such cylinder sizes and designs be used in gas delivery system 10.

It is understood that the following process description applies to both gas cylinder 12 and ton cylinder 13. Although the plating process is described with reference to a particular embodiment illustrated in FIG. 2-A, those skilled in the art will appreciate that the following electroless plating and cleaning process can apply to a wide variety of gas cylinders.

Figure 3:
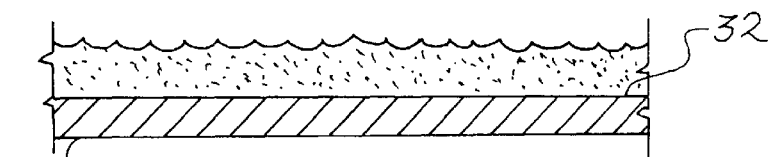
FIGS. 3 and 4 illustrate, in cross-section, a portion of a cylinder wall undergoing processing steps for the formation of an electroless nickel-phosphorous layer in accordance with the invention.
Figure 4:
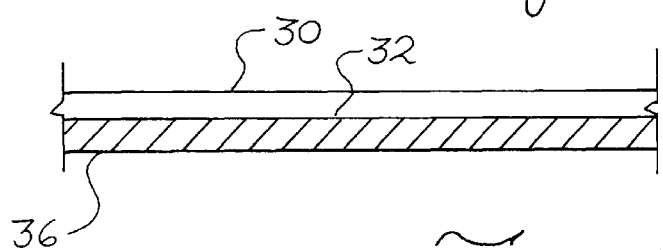

FIGS. 3 and 4 illustrate, in cross-section, a portion 36 of tank wall 34 undergoing a plating process to form nickel-phosphorous layer 30 on inner surface 32. To prepare gas cylinder 12 for electroless plating, cylinder 12 is mechanically polished using glass beads or steel grit in a the slurry mixture, while rotating the cylinder at about 60 revolutions-per-minute (rpm). The mechanical polishing process smoothes inner surface 32 and removes dirt and debris, steel burs, and the like, from inner surface 32. After completion of the mechanical polishing process, the glass beads or steel grit and the slurry mixture are removed, and the cylinder is rinsed with water.

In order to improve the adhesion of nickel-phosphorous layer 30 to steel inner surface 32, an acidic solution, preferably hydrochloric acid, is applied to surface 32. The hydrochloric acid solution can vary from about 10 to about 50% by volume. Additionally, sulfuric acid can be used varying from about 2 to about 10% by volume. Preferably, a 40% by volume hydrochloric acid solution is used to activate inner surface 32. Activation is important to initiate the autocatalitic reaction necessary for the electroless plating process. In addition, alkaline deoxidizers containing organic chelating agents, or sodium cyanide, or both, can also be used to remove oxides from inner surface 32 prior to activation.

Following surface preparation, gas cylinder 12 is directly placed in a vertical tank filled with water. A commercially available polypropylene tank holds the electroless nickel-phosphorous plating solution. The plating solution is pumped from the polypropylene tank through a filter to reduce particulates in the bath solution and into the cylinder standing in the vertical tank. Another tube allows the plating solution to flow out of the cylinder and back into the polypropylene tank.

The plating process is carried out in the bath, and the bath preferably contains nickel sulfate, sodium hypophosphite, buffers, stabilizers, and complexing agents. The bath is preferably operated at a temperature of about 85° C. to about 88° C. and the pH is maintained within a range of about 4 to 5. The deposition thickness is controlled by the residence time of gas cylinder 12 in the plating bath. The actual residence time necessary to deposit nickel-phosphorous layer 30 to the preferred thickness ranges set forth above depends upon the particular deposition rate of the plating bath. In a typical plating process carried out in accordance with the parameters above, a plating rate of about 7 to about 25 micrometers per hour can be achieved.

After completing the plating process, gas cylinder 12 is subjected to an acid detergent wash in "Oakite" solution for about 10 minutes to about 20 minutes, and more preferably about 15 minutes, followed by a deionized water rinse. Oakite is a phosphoric acid and detergent mixture available from Oakite Products, Inc. Next, gas cylinder 12 is washed for about 10 minutes to about 18 minutes, and more preferably about 15 minutes with hot deionized water having a temperature of about 50° C. to about 65° C., and more preferably about 60° C. and a resistance of about 16 megaohms. Gas cylinder 12 is then dried with filtered nitrogen and baked. A purge tube is inserted into gas cylinder 12 and a flow of filtered nitrogen is maintained during the baking process. The process is carried out for about 1 hour at about 189° C. to about 210° C., and more preferably about 200° C.

Once the baking process is complete, a tied-diaphragm-type valve is inserted into gas cylinder 12, and a vacuum baking process is carried out at about 55° C. to about 65° C., and more preferably about 60° C. and at a vacuum pressure of about 20 microns to about 50 microns, and more preferably, about 20 microns, and for about 2 hours.

Upon completion of the nickel-phosphorous electroless plating and cleaning process, gas cylinder 12 can be charged with a wide variety of corrosive liquefied gasses used by the electronics industry. Importantly, gas cylinder 12 can be charged with corrosive liquefied gasses, such as $HCl_2$, $Cl_2$, $BCl_3$, HBr, and the like.

Without further elaboration it is believed that one skilled in the art can, using the description set forth above, utilize the invention to its fullest extent. The following examples, therefore, are intended to be merely illustrative and are not intended to limit the invention.

The technique for measuring the thickness and porosity of the nickel-phosphorous layer used in the following examples is disclosed in commonly-assigned, co-pending patent application entitled "METHOD AND APPARATUS FOR MEASURING COATING QUALITY," having Ser. No. 08/885,351 filed Jul. 1, 1997, the disclosure of which is incorporated by reference herein. The measuring technique is further described in "Using A Nondestructive Test To Qualify Corrosive Specialty Gas Cylinders," A. Zdunek, et al. Micro, February, 1998, p. 33, both of which are incorporated by reference herein.

EXAMPLE I

A 44 liter water volume (44L-size) cylinder was prepared for electroless plating by subjecting the steel cylinder to a mechanical polishing process, as set forth above. The steel surface of the cylinder was activated by a 0.4 volume percent hydrochloric acid wash and placed into a nickel plating bath. Following plating, the cylinder was washed and dried, then baked at a temperature of about 190° C. for a time period of about 2 hours.

The thickness uniformity of the nickel-phosphorous layer formed by the electroless plating process was measured by inserting a probe into the steel cylinder. Thickness measurements were taken at several locations along the inner wall surface of the cylinder. Shown in FIG. 6 is a plot of nickel-phosphorous layer thickness versus depth in the cylinder. The average thickness of the nickel-phosphorous layer in the inner surface of the gas cylinder was about 18.8 micrometers. The range varied by about ±2.3 micrometers. Points 42 shown in FIG. 5 represent the thickness of the nickel-phosphorous layer as determined by 26 discrete measurements taken at various locations along the inner wall surface of the cylinder in a longitudinal direction from the top to the bottom of the gas cylinder.

The porosity of the nickel-phosphorous layer was determined by inserting an electrode assembly into the gas cylinder, then filling the cylinder with an electrolyte solution. The measured porosity and surface roughness of the nickel-phosphorous layer is shown in Table I.

TABLE 1

Electroless Nickel-Phosphorus Layer
18.8 Millimeter Thick Nickel-Phosphorus Layer

| Cylinder Position | Coating Porosity (%) | Surface Roughness (Micrometers) Ra |
|---|---|---|
| Top | 0.10 | 0.41 |
| Middle | 0.13 | 0.31 |
| Bottom | 0.10 | 0.39 |

The data in Table I indicates that all porosity measurements are below 0.15% and the surface roughness is less than 0.45 micrometers.

EXAMPLE II

To determine the metal contamination level in liquefied corrosive gases stored in gas cylinders fabricated in accordance with the invention, 25 gas cylinders were prepared by coating their inner surfaces with a nickel-phosphorous layer having a thickness of about 25 micrometers and a porosity of about 0.1%. A total of 75 cylinders were prepared by coating the inner surfaces with an electroless nickel-phosphorous layer. The cylinders were split into three groups and the cylinders of each group were filled with $Cl_2$, $BCl_3$, and HBr respectively. The concentration of Cr, Fe, and Ni in the gases contained within each cylinder was determined by removing about 50 grams to about 200 grams of liquefied gas from each cylinder and hydrolyzing in about 100 ml to about 200 ml of water. The metal concentration was measured using an inductively-coupled plasma mass spectrometer (ICPMS). About 1 ml of each sample of hydrolyzed solution was injected into the ICPMS. The results of the metal analysis for each group are shown in Table II below.

TABLE II

Metal Contaminant Concentration (ppb)
One ml Samples ICPMS Measurements

| Cylinder Number | Corrosive Gas | | | | | | | | |
|---|---|---|---|---|---|---|---|---|---|
| | $Cl_2$ | | | $BCl_3$ | | | HBr | | |
| | Cr | Fe | Ni | Al | Fe | Ni | Cr | Fe | Ni |
| 1 | * | 46.5 | * | 10.2 | 15.5 | 18.8 | 27.69 | 46.7 | 25.52 |
| 2 | 0.53 | 0.53 | 0.51 | 1.6 | 0.13 | 0.09 | 45.86 | 70.6 | 36.97 |
| 3 | 1.25 | 1.25 | 1.25 | 3.7 | 11.36 | 1.23 | 0.46 | 1.16 | 1316 |
| 4 | 0.75 | 1.5 | 0.75 | 24.8 | 26.04 | 1.9 | 0.46 | 1.16 | 1.16 |
| 5 | 0.75 | 1.5 | 3.72 | 0.88 | 24.03 | 4.69 | 8.4 | 0.47 | 1.44 |
| 6 | 0.75 | 1.5 | 0.75 | 8.21 | 14.44 | 2.55 | 2.4 | 5.31 | 1.77 |
| 7 | 0.75 | 1.5 | 0.75 | 2.89 | 4.63 | 0.67 | 2.64 | 3.57 | 1.37 |
| 8 | * | 25.75 | * | 2.06 | 10.48 | 0.61 | 0.46 | 0.46 | 8.46 |
| 9 | * | 40.54 | * | 5.2 | 5.02 | 0.5 | 0.46 | 0.46 | 14.74 |
| 10 | 0.2 | 5.86 | 0.79 | 9.87 | 15.77 | 2.14 | 1.11 | 21.67 | 1.11 |
| 11 | * | 6.06 | * | 2.31 | 15.19 | 1.76 | 7.15 | 13.08 | 3.83 |
| 12 | * | 2.93 | * | 3.65 | 6.74 | 1.13 | 0.89 | 8.89 | 1.53 |
| 13 | 0.5 | 4.02 | 1.49 | 7.95 | 15.53 | 1.19 | 1.88 | 4.64 | 4.8 |
| 14 | 0.5 | 5.77 | 1.52 | 2.62 | 17.9 | 1.92 | 8.36 | 43.8 | 2 |
| 15 | 0.5 | 6.26 | 1.52 | 2.16 | 7.1 | 0.54 | 7.6 | 31.52 | 3.72 |
| 16 | 0.5 | 4.46 | 1.44 | 4.72 | 26.12 | 1.11 | 7.72 | 7.64 | 2 |
| 17 | 0.5 | 9.2 | 3.52 | 6.12 | 19.21 | 1.2 | 2 | 16.36 | 2 |
| 18 | 6.66 | 14.7 | 0.96 | 3.89 | 13.36 | 0.5 | 29.04 | 13.2 | 2 |
| 19 | 7.2 | 61.18 | 2.42 | 3.69 | 11.61 | 0.63 | 2 | 8.64 | 2 |
| 20 | 5.48 | 6.18 | 2 | 3.87 | 0.25 | 2.52 | 2 | 10.84 | 2 |
| 21 | 4 | 22.86 | 1.02 | 6 | 14 | 5 | 2 | 39.92 | 2 |
| 22 | 3 | 14.15 | 1.44 | 5 | 8 | 5 | 5.12 | 31.36 | 5.12 |
| 23 | 2.61 | 23.66 | 1.34 | 5 | 20 | 5 | 2.24 | 14.46 | 2.24 |

TABLE II-continued

| Cylinder Number | Metal Contaminant Concentration (ppb) One ml Samples ICPMS Measurements | | | | | | | | |
|---|---|---|---|---|---|---|---|---|---|
| | Corrosive Gas | | | | | | | | |
| | Cl$_2$ | | | BCl$_3$ | | | HBr | | |
| | Cr | Fe | Ni | Al | Fe | Ni | Cr | Fe | Ni |
| 24 | 1.58 | 11.51 | 1 | 4.57 | 8.58 | 0.75 | 4.44 | 17.76 | 4.44 |
| 25 | 1 | 1 | 1.66 | 6.1 | 29.14 | 1.92 | 3.92 | 92.04 | 3.92 |

*Below the detection limit of ICPMS

The results indicate that in virtually all gas cylinders, the metal contaminant concentrations are well below 100 ppb.

Thus it is apparent that there has been disclosed a corrosion resistant gas cylinder and gas delivery system that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. For example, various plating preparation techniques can be utilized, such as the application of various deoxidizing agents. It is therefore intended to include within the invention all such variations and modifications as fall within the scope of the appended claims and equivalents thereof.

What is claimed is:

1. A high-pressure steel gas cylinder comprising:
   a cylinder wall having an inner surface,
   an electroless nickel-phosphorus layer overlying the inner surface having a thickness of at least about 20 micrometers and a porosity of no greater than about 0.1%; and a surface roughness of no greater than about 5 micrometers,
      wherein the electroless nickel-phosphorus layer is subjected to an acid wash and a hot deionized water wash, followed by a first bake under continuous nitrogen flow and a second bake under vacuum pressure.

2. The gas cylinder of claim 1, wherein the electroless nickel-phosphorus layer comprises a nickel-phosphorus layer having a thickness of about 20 to about 50 micrometers.

3. The gas cylinder of claim 2, wherein the electroless nickel-phosphorus layer comprises a nickel-phosphorus layer having a thickness of about 25 micrometers.

4. The gas cylinder of claim 1, wherein the electroless nickel-phosphorus layer comprises a nickel-phosphorus layer having a porosity of no greater than about 0.05%.

5. The gas cylinder of claim 4, wherein the electroless nickel-phosphorus layer comprises a nickel-phosphorus layer having a porosity of no greater than about 0.01%.

6. The gas cylinder of claim 1, wherein the electroless nickel-phosphorus layer comprises a nickel-phosphorus layer having a surface roughness of no greater than about 3 micrometers.

7. The gas cylinder of claim 1, wherein the cylinder wall comprises low-carbon polished steel.

8. The gas cylinder of claim 1, wherein the electroless nickel-phosphorus layer comprises a nickel-phosphorus layer having at least about 10 wt. % phosphorus.

9. A high-pressure gas cylinder for storage and delivery of high-purity corrosive gases comprising:
   a cylindrical body having an inner surface; and
   a continuous electroless nickel-phosphorus layer overlying the inner surface,
      wherein the electroless nickel-phosphorus layer has a thickness of at least about 20 micrometers and a porosity of about 0.1 to about 0.15% and a surface roughness of no greater than about 5 micrometers, and
      wherein the electroless nickel-phosphorus layer is subjected to a hot deionized water washing, followed by a first bake under continuous nitrogen flow and a second bake under vacuum pressure.

10. The gas cylinder of claim 9, wherein the nickel-phosphorus layer comprises a nickel-phosphorus layer having at least about 10 wt. % phosphorus.

11. The gas cylinder of claim 9, wherein the nickel-phosphorus layer comprises a nickel-phosphorus layer having a surface roughness of no greater than about 3 micrometers.

12. The gas cylinder of claim 9, wherein the cylinder wall comprises low-carbon, polished steel.

13. The gas cylinder of claim 9, wherein the nickel-phosphorus layer comprises a nickel-phosphorus layer having a thickness of about 20 to about 50 micrometers.

* * * * *

UNITED STATES PATENT AND TRADEMARK OFFICE
CERTIFICATE OF CORRECTION

PATENT NO. : 6,290,088 B1
DATED : September 18, 2001
INVENTOR(S) : Alan D. Zdunek et al.

It is certified that error appears in the above-identified patent and that said Letters Patent is hereby corrected as shown below:

Title page,
Item [73], delete "Americas".

OTHER PUBLICATIONS,
Line 1, delete "Zadunek" and substitute -- Zdunek -- in its place.

Signed and Sealed this

Ninth Day of April, 2002

Attest:

Attesting Officer

JAMES E. ROGAN
Director of the United States Patent and Trademark Office